Jan. 15, 1929.

P. DE NARDO 1,699,054

STOVE

Filed March 13, 1928 2 Sheets-Sheet 1

INVENTOR.
Peter DeNardo
BY
Bacon and Thomas
ATTORNEYS

Jan. 15, 1929.
P. DE NARDO
STOVE
Filed March 13, 1928
1,699,054
2 Sheets-Sheet 2

INVENTOR.
Peter DeNardo
BY
Bacon and Thomas
ATTORNEYS

Patented Jan. 15, 1929.

1,699,054

UNITED STATES PATENT OFFICE.

PETER DE NARDO, OF MIDLAND, PENNSYLVANIA.

STOVE.

Application filed March 13, 1928. Serial No. 261,353.

This invention relates to stoves.

The primary object of the invention is to provide a construction affording a combined hot air heater, hot water heater, and oven.

A further object of the invention is to provide a structure of the character stated which is of compact formation and inexpensive in nature, and necessitating but three castings, consisting of the base, and the integral casting of fire chamber, water boiler and oven, and the removable side permitting installation of the boiler.

Another object of the invention is to integrally cast the oven with respect to the side walls of the stove, which oven is disposed within the confines thereof.

A more specific object of the invention is to provide an inwardly extending tubular wall constituting the fire chamber and a removable side casing of semi-tubular formation adapted to conceal, but render accessible, the water boiler.

Figure 1:
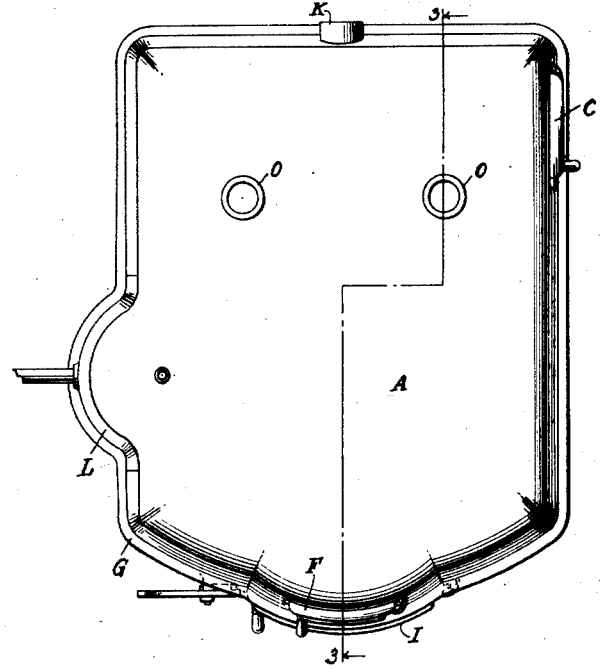
Figure 2:
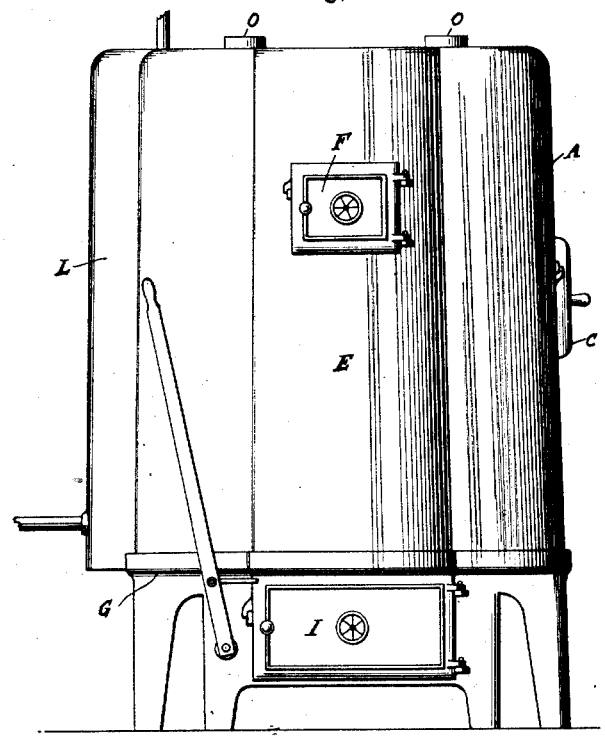
Figure 3:
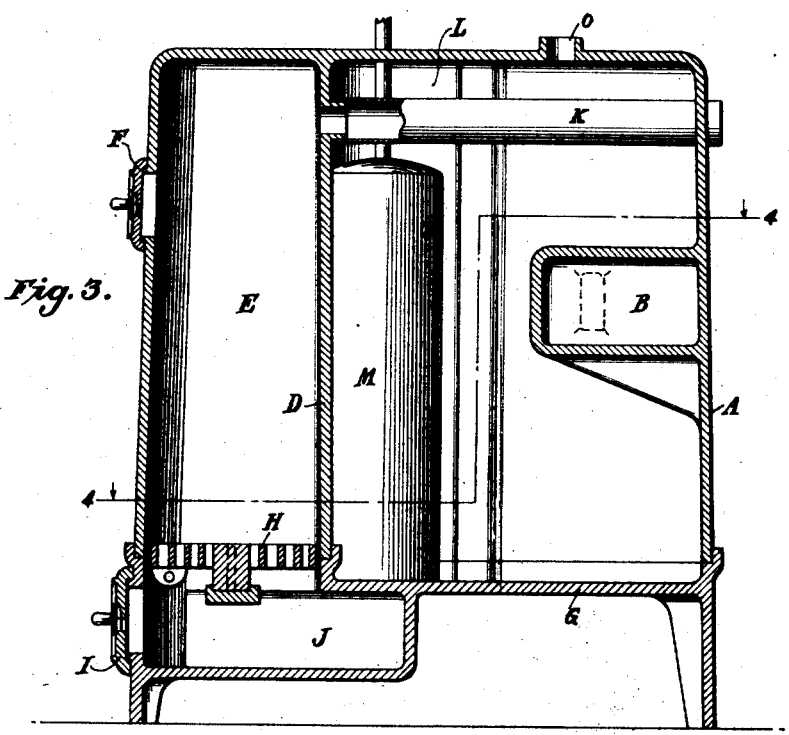
Figure 4:
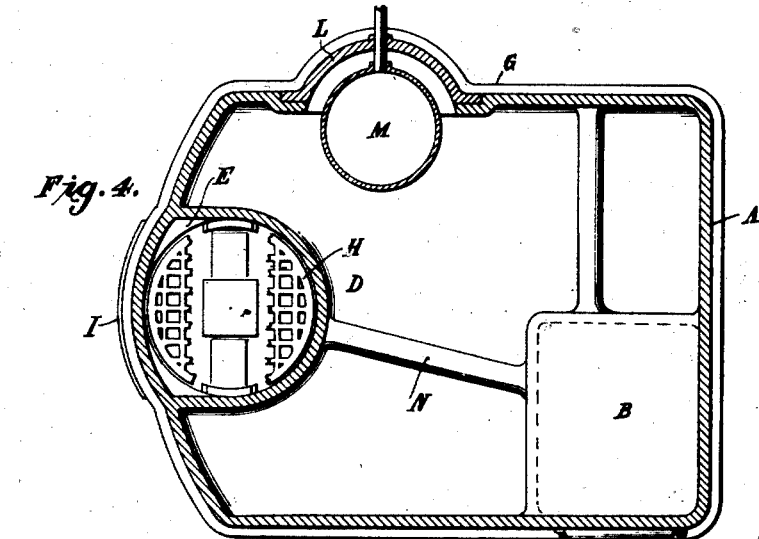

Numerous other and subordinate objects of the invention will be apparent to those skilled in the art from a reading of the following specification in conjunction with the drawings attached hereto and forming a part hereof, in which Fig. 1 is a top view, Fig. 2 a side elevation, Fig. 3 a vertical section taken on line 3—3 of Fig. 1, and Fig. 4 a cross section.

Referring now specifically to the drawing. A represents what I broadly term the stove casing. This stove casing has cast integrally therewith an inwardly disposed oven B at one corner, which oven has a door C of any suitable form. The stove casing also has an inwardly extending integral wall D constituting the fire chamber E, which fire chamber has a suitable door F into which articles to be cooked may be projected and supported, if desired.

The base G has supporting legs of suitable formation thereon and is further provided with a grating H and a removable cover I rendering the ash pan J accessible for cleaning. Communicating with the fire chamber E is the chimney K for conveying the products of combustion to a desired outlet. The invention comprehends the employment of a removable side casing L of substantially semi-tubular formation which may be fastened to the stove casing in any desirable manner. This semi-tubular formation of the removable side casing provides for the installation of a water boiler M having suitable inlets and outlets. Obviously, the water boiler may be rendered accessible for removal or repair by the removal of the said side casing L. Preferably, the tubular wall D constituting the fire chamber is braced from the oven as by means of the element N. The operation of the hot air heater thus far described will be apparent. The products of combustion within the fire chamber will serve to thoroughly heat the water boiler and the oven, both of which are cast in such a manner as to extend inwardly with respect to the confines of the stove casing. The hot air within the stove casing finds its outlet as at O to any suitable point, and, of course, may be humidified, if desired, at its point of discharge into the room.

The ash pan is cast integrally with the base as shown in Fig. 3. The base is further provided with a flange which conforms substantially to the bottom periphery of the stove casing, having an outwardly extending portion conforming substantially to the removable side wall casing for the water boiler.

It will be apparent from the foregoing that the invention contemplates the use of not more than three castings, as the maximum, and that the products of combustion within the fire chamber may be advantageously employed for the purpose of maintaining a supply of hot water and of heating the integrally cast oven.

What I claim is as follows:

A combination hot air heater, hot water boiler, and oven of the character described, comprising a base having an integrally cast ash pan, a stove casing mounted on the base and conforming substantially to the exterior shape thereof, said casing having an inwardly extending wall at one corner thereof constituting an oven, a door for the oven, an inwardly extending wall of substantially tubular formation associated with the front portion of the stove casing for forming a fire chamber, a chimney mounted in the upper part of said casing and transversely disposed and overhanging the boiler, hot air outlets associated with the stove casing for conveying heated air to the point of use, and a hot water boiler located within the confines of the stove casing.

In testimony whereof I affix my signature.

PETER DE NARDO.